3,658,858
DI-(6-METHOXY-2-NAPHTHYL) CADMIUM
Ian T. Harrison, Palo Alto, Calif., assignor to Syntex
Corporation, Panama, Panama
No Drawing. Filed Sept. 30, 1969, Ser. No. 862,496
Int. Cl. C07f 3/02, 3/08
U.S. Cl. 260—429 R                 1 Claim

ABSTRACT OF THE DISCLOSURE 2-(6-methoxy-2-naphthyl)propionic acid is prepared by reacting di-(6-methoxy-2-naphthyl)cadmium with a lower alkyl 2-halopropionate in a suitable solvent to form a lower alkyl 2-(6-methoxy-2-naphthyl)propionate, and hydrolyzing the ester group thereof. The product has anti-inflammatory, analgesic, and anti-pyretic activities.

---

This invention relates to the process for preparing 2-(6-methoxy-2-naphthyl)propionic acid and an intermediate therefor.

In general, the process of this invention for preparing 2-(6-methoxy-2-naphthyl)propionic acid comprises the steps of reacting di-(6-methoxy-2-naphthyl)cadmium with a lower alkyl 2-halo propionate in an ether solvent until a lower alkyl 2-(6-methoxy-2-naphthyl)propionate is formed, wherein the halo group is bromo, iodo or chloro; hydrolyzing the ester group of the 2-(6-methoxy-2-naphthyl)propionate; and recovering 2-(6-methoxy-2-naphthyl)propionic acid from the reaction mixture. Preferably the product is resolved to yield d 2-(6-methoxy-2-naphthyl)propionic acid.

The process of this invention can be illustrated by the following formulas:

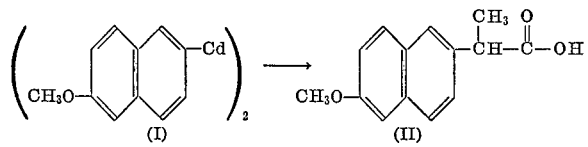

The term "lower alkyl" includes primary, secondary and tertiary alkyl groups of straight and branched chain configuration having up to 6 carbons. Examples are methyl, ethyl, propyl, isopropyl, n-butyl, i-butyl, t-butyl, n-pentyl, n-hexyl and the like.

The compound of Formula II is prepared by reacting the compound of Formula I with at least 2 and preferably from 2 to 3 molar equivalents of a lower alkyl 2-halopropionate in an ether solvent until the corresponding lower alkyl 2-(6-methoxy-2-naphthyl)propionate is formed.

Suitable lower alkyl 2-halo propionates have, as the halo group, bromo, iodo or chloro and include methyl 2-bromopropionate, ethyl 2-bromopropionate, propyl 2-bromopropionate, isopropyl 2-bromopropionate, n-butyl 2-bromopropionate, t-butyl 2-bromopropionate, n-hexyl 2-bromopropionate, and the corresponding iodo and chloro compounds, and the like.

Any conventional ether solvent can be used in this reaction. Suitable solvents include diethyl ether, other dilower alkyl ether, tetrahydrofuran, tetrahydropyran, dimethoxyethane and the like.

The reaction is carried out at a temperature of from 0 to 60° C., and preferably from 20 to 30° C. The time required for the reaction depends upon the reaction temperature, times of from 1 hour to 1 day usually being sufficient.

The lower alkyl 2-(6-methoxy-2-naphthyl)propionates are then hydrolyzed to yield the compound of Formula II. The hydrolysis can be achieved by treatment with base followed by acidification or by treatment with a strong acid. For basic hydrolysis, a solution of a strong base such as sodium or potassium hydroxide in a suitable solvent such as water is mixed with the reaction mixture, and the reaction mixture is maintained at a temperature of from 25° C. to reflux temperature until hydrolysis occurs. Usually from 10 minutes to 6 hours is sufficient for this hydrolysis. The reaction mixture is then acidified with an acid such as acetic acid, trifluoroacetic acid, p-toluenesulfonic acid, hydrochloric acid, hydrobromic acid, hydroiodic acid, sulfuric acid, phosphoric acid and the like.

Alternatively, the reaction mixture is mixed with a solution of a strong organic or inorganic acid such as trifluoroacetic acid, p-toluenesulfonic acid, hydrochloric acid, hydrobromic acid, hydroiodic acid, sulfuric acid, phosphoric acid and the like at a temperature of at least 60° C. and preferably from 90° C. to the boiling point of the mixture until the hydrolysis occurs. Suitable solvents for the acid include water, acetic acid, aqueous alcohols, and the like. From 4 to 24 hours are usually sufficient for this reaction. If acid hydrolysis is employed, the free acid of Formula II is formed directly. If necessary, the reaction mixture can be diluted with water to precipitate the product.

The product compound of Formula II is then separated from the reaction mixture by conventional procedures. For example the reaction mixture can be filtered prior to precipitation of the compound of Formula II to separate the solution from residual solids, the reaction mixture can be acidified to precipitate the compound of Formula II as described above, and the precipitate can be removed by filtration and recrystallized from acetone-hexane. Alternatively, the reaction mixture can be extracted with a suitable solvent such as ether, and the ether phase separated, evaporated, and the residue recrystallized from acetone-hexane. Chromatography can also be used to purify and/or isolate the product compound of Formula II.

The preferred product is d 2-(6-methoxy-2-naphthyl) propionic acid. To obtain this product, optical resolution of the compound of Formula II can be achieved by selective biological degradation or by preparation of di-astereo isomer salts of the 2-(6-methoxy-2-naphthyl)propionic acid with a resolved optically active amine base such as cinchonidine and then separating the thus formed diastereo isomer salts by fractional crystallization. The separate diastereo isomer salts are then acid cleaved to yield the respective d 2-(6-methoxy-2-naphthyl)propionic acid.

The compound of Formula I can be prepared from 6-methoxy-2-naphthylbromide, chloride or iodide as shown by the following formulas:

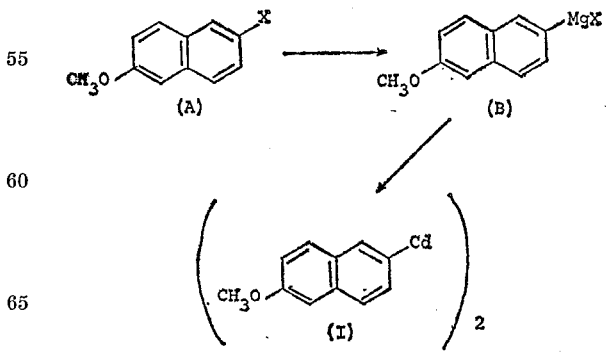

In the above formulas, X is chloro, bromo, or iodo.

The compounds of Formula A are all known compounds. The compounds of Formula B can be prepared by reacting the compounds of Formula A with magnesium in an ether solvent such as tetrahydrofuran at elevated temperatures. The compound of Formula I can be prepared by reacting the compounds of Formula B with cadmium chloride at elevated temperatures.

The compound of Formula II exhibits anti-inflammatory, analgesic and anti-pyretic activities and is accordingly employed in the treatment of inflammation, pain and pyrexia in mammals. For example, inflammatory conditions of the muscular skeletal system, skeletal joints and other tissues can be treated. Accordingly, this compound is useful in the treatment of conditions characterized by inflammation such as rheumatism, concussion, laceration, arthritis, bone fractures, post-traumatic conditions and gout.

This invention is further illustrated by the following specific but non-limiting examples.

EXAMPLE 1

A solution of 24 g. of 2-bromo-6-methoxynaphthalene in 300 ml. of tetrahydrofuran is slowly added to 2.5 g. of magnesium turnings and 100 ml. of tetrahydrofuran at reflux temperature. After the addition is complete, 20 g. of cadmium chloride is added, and the resultant mixture is refluxed for 10 minutes to yield a solution of di-(6-methoxy-2-naphthyl)cadmium (which can be separated by conventional chromatography). However, separation is unnecessary.

A solution of 18 g. of ethyl 2-bromopropionate in 20 ml. of tetrahydrofuran is then added to the cooled reaction mixture. After 24 hours at 20° C., the product is hydrolyzed by adding 200 ml. of 5 weight percent methanolic sodium hydroxide followed by heating to reflux for 1 hour. The reaction mixture is then diluted with excess 1 N sulfuric acid and extracted with ether. The ether phase is separated, evaporated to dryness and the residue is recrystallized from acetone-hexane to yield 2-(6-methoxy-2-naphthyl)propionic acid.

EXAMPLE 2

Repeating the procedure of Example 1 but replacing ethyl 2-bromopropionate with ethyl 2-iodopropionate and ethyl 2-chloropropionate, in each instance, yields 2-(6-methoxy-2-naphthyl)-propionic acid.

EXAMPLE 3

A solution of dl 2-(6-methoxy-2-naphthyl)propionic acid in methanol is prepared by dissolving 230 g. of the product of Example 1 in 4.6 l. of warm methanol. The resulting solution is boiled until it becomes turbid; then sufficient methanol is added to make the solution clear again. This hot solution is added to a solution of 296 g. of cinchonidine in 7.4 l. of methanol heated to about 60° C. The solutions are combined while stirring, and the combined mixture is then allowed to reach room temperature over a 2 hour period. After the reaction mixture has reached room temperature, it is stirred for an additional 2 hours and then filtered. The filtered solids are washed with several portions of cold methanol and dried.

100 grams of the cinchonidine salt crystals are added to a stirred mixture of 600 ml. of ethyl acetate and 450 ml. of a 2 N aqueous hydrochloric acid. After the mixture has been stirred for 2 hours, the ethyl acetate layer is removed and washed with water to neutrality, dried over sodium sulfate and evaporated to yield d 2-(6-methoxy-2-naphthyl)propionic acid.

I claim:
1. Di-(6-methoxy-2-naphthyl)cadmium.

References Cited

Dauben et al.: J. Am. Chem. Soc. 73 (1957), p. 1853–4.
Kidwell et al.: Tetrahedron Letters, 1966, p. 531–5.
Dauben et al.: J. Org. Chem. 15, p. 785–8.

TOBIAS E. LEVOW, Examiner

A. P. DEMERS, Assistant Examiner

U.S. Cl. X.R.
260—520, 665 G, 999